Figure 1:
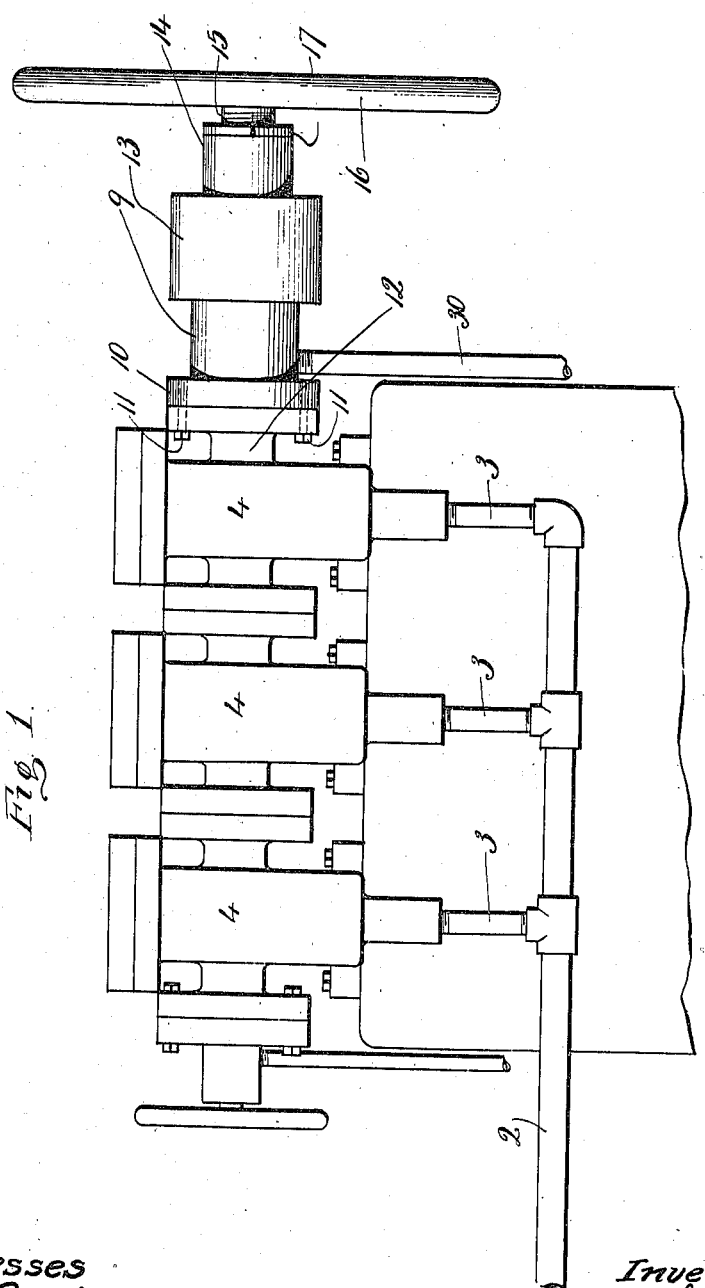

F. P. CRIBBINS.
MACHINE FOR HOMOGENIZING MILK.
APPLICATION FILED SEPT. 19, 1910.

996,704.

Patented July 4, 1911.

Witnesses
C. J. Reed
C. L. Weed

Inventor
Frank P. Cribbins
By Atty's

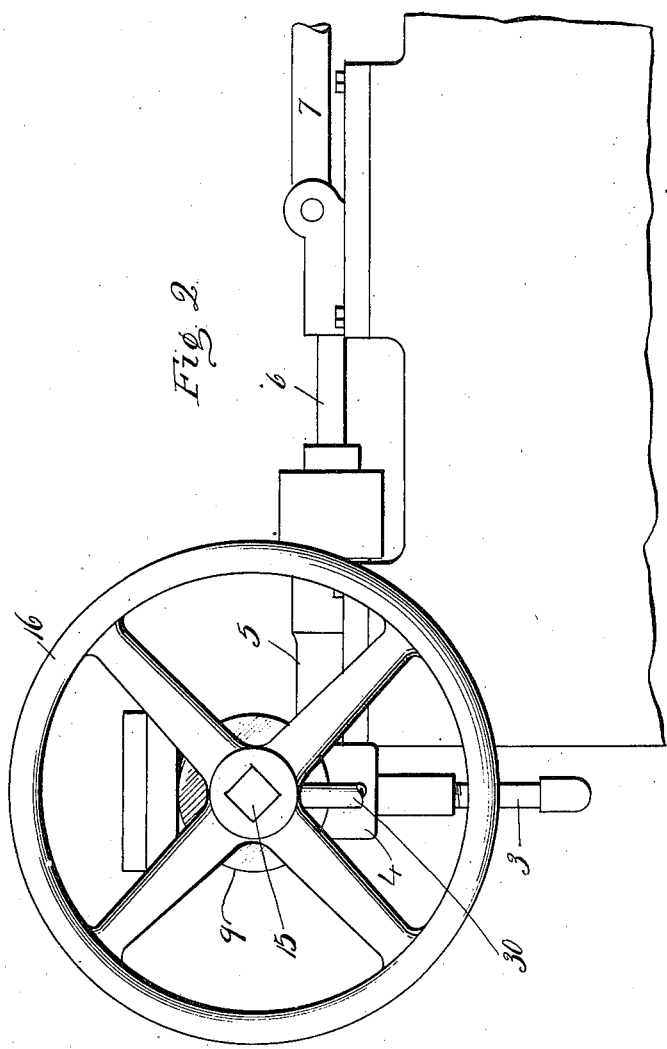

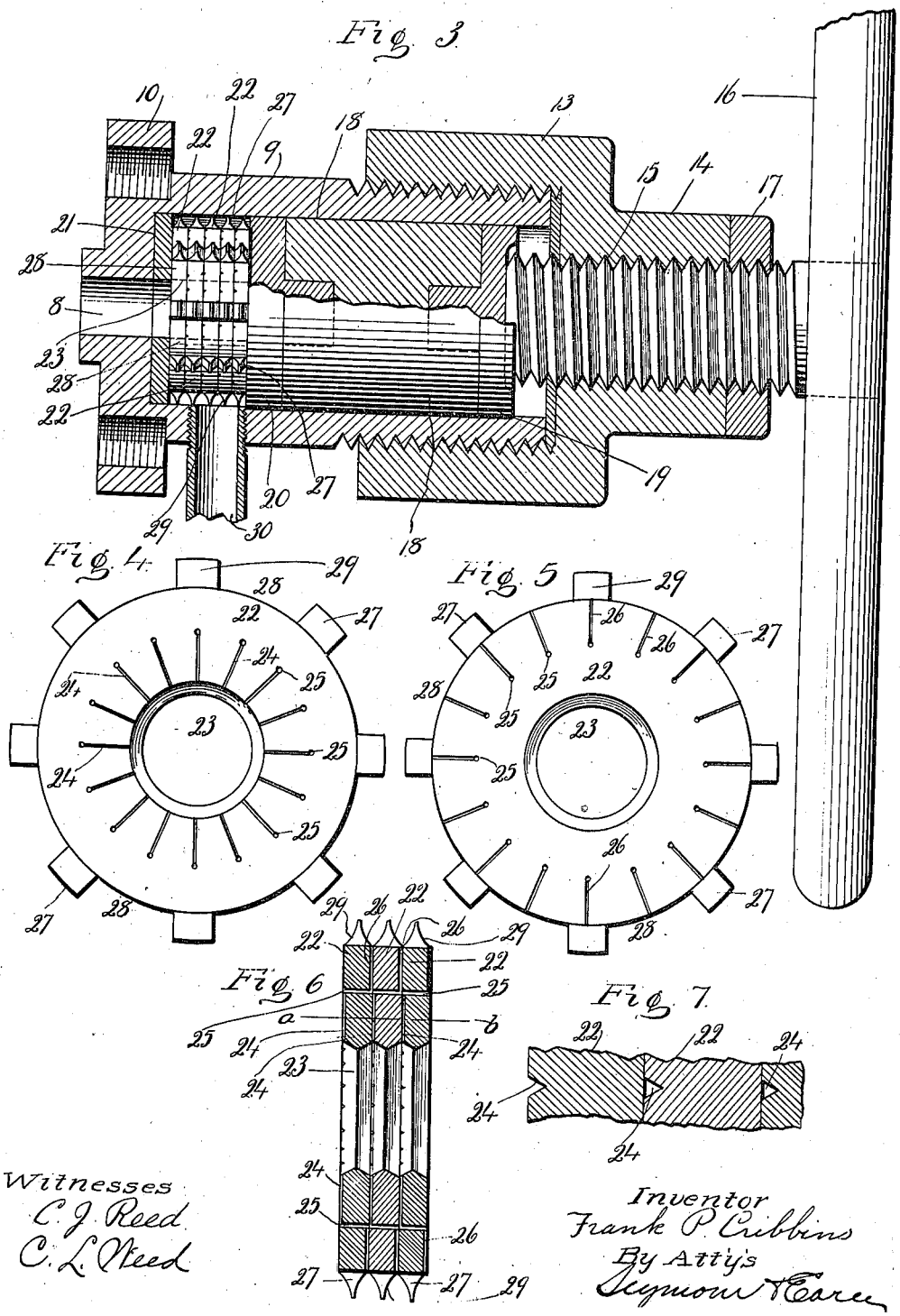

UNITED STATES PATENT OFFICE.

FRANK P. CRIBBINS, OF DERBY, CONNECTICUT.

MACHINE FOR HOMOGENIZING MILK.

996,704.      Specification of Letters Patent.      Patented July 4, 1911.

Application filed September 19, 1910. Serial No. 582,726.

*To all whom it may concern:*

Be it known that I, FRANK P. CRIBBINS, a citizen of the United States, residing at Derby, in the county of New Haven and State of Connecticut, have invented a new and useful Improvement in Machines for Homogenizing Milk; and I do hereby declare the following, when taken in connection with the accompanying drawings and the letters of reference marked thereon, to be a full, clear, and exact description of the same, and which said drawings constitute part of this specification, and represent, in—

Figure 1 a view in end elevation of a machine for treating milk, cream, etc., constructed in accordance with my invention. Fig. 2 a broken view thereof in side elevation. Fig. 3 a broken view in vertical longitudinal section of the pressure-box of the machine. Fig. 4 a detached view in side elevation of one of the fiber-breaking disks employed in the pressure-box. Fig. 5 a reverse view thereof. Fig. 6 a sectional view showing three of the washers placed side by side. Fig. 7 a broken sectional view on the line *a—b* of Fig. 6, but drawn to a larger scale.

My invention relates to an improvement in that class of machines designed to be employed in the preservative treatment or homogenizing of milk, cream, butter and other kindred substances, the object being to increase the output and efficiency of such machines.

With these ends in view my invention consists in a milk homogenizing machine having certain details of construction and combinations of parts as will be hereinafter described and pointed out in the claims.

In carrying out my invention as herein shown, the milk or cream, or whatever else is to be treated, is introduced into the machine through an inlet pipe 2 from which it is led through branch pipes 3 into a gang of three upright storage cylinders or accumulators 4 connected with pressure-cylinders 5 containing pistons not shown, but having piston-rods 6 connected with eccentric rods 7. The number of such storage and pressure cylinders 4 and 5 employed and their construction and arrangement may be varied as desired, it being only necessary to provide means for placing the milk or cream, or whatever else is to be treated, under a high degree of pressure—say, about four thousand pounds. The milk, or whatever else is treated, is preferably heated to about 140° before its introduction into the inlet pipe 2. The storage cylinders 4 are connected in series and deliver the milk under pressure through a port 8 into a horizontally arranged pressure-box 9 formed at its inner end with a flange 10 by means of which it is secured by bolts 11 to the main casing 12. At its opposite end, the box 9 is externally threaded for the application of a heavy cap 13 having a hub 14 receiving a pressure-screw 15 furnished with a hand-wheel 16 and a check-nut 17.

Within the box 9, I locate a brass plunger 18 provided at its respective ends with steel followers 19 and 20 fitting tightly within the box. In the extreme inner end of the box 9 I locate a washer 21 and in the space between the same and the follower 20 aforesaid, I locate a number of globule-breaking disks 22 which constitute, as I may say, the leading feature of my present invention. As shown, I employ five of these disks, but the number may be varied as desired—the greater the number employed the greater will be the capacity of the machine. They are preferably made of German silver, though I do not limit myself to the use of such material. I have chosen to call them "globule-breaking" disks because their function is to break up all of the larger fat globules of the milk in such a way as to permanently commingle all of the constituents of the milk as it were, and prevent their separation, whereby the milk is greatly improved in its keeping qualities without the addition of extraneous preservative substances. Each of the disks is formed with a circular central opening 23 substantially corresponding in diameter to the diameter of the inlet-port 8. Each disk is also formed upon the inner portion of one face with a circular series of very small radial triangular grooves 24 the inner ends of which open into the central opening 23 of the disk and the outer ends of which open into a circular series of very small transverse holes 25 formed in the disk about midway between its central opening 23 and its periphery. The outer portion of the opposite face of the disk is formed with a corresponding series of small radial triangular grooves 26 leading from the opposite ends of the holes 25 to the periphery of the disk.

The outer edges of the several disks are formed with radial fingers 27 spaced at equal distances apart and separated by wide passages 28 through which the broken milk may flow. These fingers are also tapered by having their opposite faces concaved as at 29 so that the milk may pass around the disks for being discharged into the outlet pipe 30 which might be called the "homogenized milk" pipe.

The triangular grooves 24 and 26 are open on one side but they are relatively so arranged, as shown, that when the disks are placed face to face, the face of one disk closes the grooves of the adjacent disk and so on. In this way the disks complement each other except the end disks, the exposed grooves of which are closed by the adjacent face of the follower 20 and the adjacent face of the washer 21.

The radial grooves 24, the transverse holes 25 and the radial grooves 26 are all made smaller in size than the size of the fat globules which it is desired to break up and incorporate with the milk serum so that it is impossible for the milk to pass through the said grooves and holes without having its larger fat globules at least thoroughly broken up.

The pressure within the pressure-box 9 is regulated by the hand-wheel 16 which is turned in one way or the other as required to increase or decrease the tightness with which the disks 22 are held together. It is not practicable to start the machine at full pressure, but the pressure must be reached gradually. Preparatory to starting the machine, therefore, the hand-wheel 16 is operated so as to largely relieve the pressure between the disks. Then after the machine has been started, the hand-wheel is operated so as to gradually squeeze the disks together until the obstruction of the disks to the free passage of the milk represents a total pressure of something like four thousand pounds.

I claim:—

1. A globule-breaking disk for use in machines for homogenizing milk, cream and kindred substances, the said disk having a central opening and formed upon the inner portion of one face with a circular series of radial grooves the inner ends of which intersect its central opening, and upon the outer portion of its opposite face with a corresponding series of grooves the outer ends of which intersect its periphery, and the said disk being also formed with a circular series of transverse holes uniting the adjacent ends of the complementary grooves.

2. A globule-breaking disk for use in machines for homogenizing milk, cream and kindred substances, the said disk having a central opening and formed upon the inner portion of one face with a circular series of radial grooves of triangular section and upon the outer portion of its opposite face with a corresponding series of radial grooves of triangular section, and with a series of transverse holes uniting the outer ends of the grooves of one series with the inner ends of the corresponding grooves of the other series.

3. A globule-breaking disk for use in machines for homogenizing milk, cream and kindred substances, the said disk having a central opening and formed upon the inner portion of one face with a circular series of radial grooves, and upon the outer portion of its opposite face with a corresponding series of radial grooves, and the outer ends of one series of grooves being connected with the inner ends of the complementary grooves of the other series by means of transverse holes through the disk, and each disk having its edge formed with a series of fingers cut away for clearance.

4. In a machine for homogenizing milk, cream and kindred substances, the combination with a pressure-box, of a series of globule-breaking disks located therein, each disk having a central opening and formed upon the inner portion of one face with a series of radial grooves, and upon the outer portion of its opposite face with a corresponding series of radial grooves and the outer ends of the inner series of grooves being connected with the inner ends of the outer series of grooves by means of a circular series of transverse holes.

5. In a machine for homogenizing cream, milk and kindred substances, the combination with a pressure-box, of a plunger located therein, a pressure-screw for operating the said plunger, a hand-wheel for operating the screw, and a series of globule-breaking disks located within the pressure-box and pressed together by the said plunger and pressure-screw, the said disks being formed with radially arranged globule-breaking channels passing from one side of each disk to the other side thereof and leading radially outward from the center of the disk to its periphery.

In testimony whereof, I have signed this specification in the presence of two subscribing witnesses.

FRANK P. CRIBBINS.

Witnesses:
ROBERT J. BENHAM,
C. J. MACALLER.